(12) United States Patent
Chen et al.

(10) Patent No.: US 11,894,952 B2
(45) Date of Patent: Feb. 6, 2024

(54) DEVICE AND METHOD OF HANDLING AN UPLINK TRANSMISSION WITH SOUNDING REFERENCE SIGNALS

(71) Applicant: ACER INCORPORATED, New Taipei (TW)

(72) Inventors: Jen-Hsien Chen, New Taipei (TW); Chien-Min Lee, New Taipei (TW); Li-Chung Lo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 57 days.

(21) Appl. No.: 17/180,868

(22) Filed: Feb. 22, 2021

(65) Prior Publication Data

US 2021/0297290 A1 Sep. 23, 2021

Related U.S. Application Data

(60) Provisional application No. 62/991,598, filed on Mar. 19, 2020.

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0048* (2013.01); *H04W 72/046* (2013.01);
(Continued)

(58) Field of Classification Search
CPC ... H04L 25/0226; H04L 5/0048; H04L 5/001; H04L 5/0023; H04L 5/0051; H04L 5/0053; H04L 5/0094; H04W 72/0413; H04W 72/046; H04W 72/0493; H04W 72/14; H04W 72/04; H04W 74/0816;
(Continued)

(56) References Cited

U.S. PATENT DOCUMENTS

2019/0013909 A1 1/2019 Li
2019/0200389 A1 6/2019 Li
(Continued)

FOREIGN PATENT DOCUMENTS

JP 2019-140436 A 8/2019
WO WO-2021156822 A1 * 8/2021

OTHER PUBLICATIONS

Samsung, UL beam management, 3GPP TSG RAN WG1#89, Hangzhou, China, May 15-19, 2017, R1-1707952, XP051262854.
(Continued)

*Primary Examiner* — Candal Elpenord
(74) *Attorney, Agent, or Firm* — Winston Hsu

(57) ABSTRACT

A communication device for handling an uplink (UL) transmission with a plurality of sounding reference signals (SRSs) comprises at least one storage device; and at least one processing circuit, coupled to the at least one storage device. The at least one storage device stores instructions, and the at least one processing circuit is configured to execute the instructions of: selecting a SRS from a plurality of SRSs; performing a channel sensing procedure via a spatial relation associated with the SRS, to obtain a result; and performing an UL transmission via the spatial relation to a network according to the result.

22 Claims, 11 Drawing Sheets

(51) Int. Cl.
| | |
|---|---|
| *H04W 74/08* | (2009.01) |
| *H04W 72/14* | (2009.01) |
| *H04W 72/04* | (2023.01) |
| *H04W 72/044* | (2023.01) |
| *H04W 72/21* | (2023.01) |
| *H04W 72/23* | (2023.01) |
| *H04W 72/53* | (2023.01) |

(52) U.S. Cl.
CPC ............ *H04W 72/21* (2023.01); *H04W 72/23* (2023.01); *H04W 72/53* (2023.01); *H04W 74/0816* (2013.01)

(58) Field of Classification Search
CPC ..... H04W 72/21; H04W 72/23; H04W 72/53; H04W 74/0808; H04W 74/006; H04W 16/14; H04B 7/0413
USPC .................................................. 370/329–330
See application file for complete search history.

(56) References Cited

U.S. PATENT DOCUMENTS

| | | | |
|---|---|---|---|
| 2019/0230706 A1* | 7/2019 | Li | H04W 72/1205 |
| 2020/0196277 A1* | 6/2020 | Zhou | H04W 72/0413 |
| 2021/0184812 A1* | 6/2021 | MolavianJazi | H04L 5/0048 |

OTHER PUBLICATIONS

Panasonic, NR-U UL signals and channels, 3GPP TSG RAN WG1 Ad-Hoc Meeting 1901, R1-1900240, Taipei, Taiwan, Jan. 21-25, 2019, pp. 1-8.

Samsung, Remaining Issues on Multi-Beam Operation, 3GPP TSG RAN WG1 Meeting #94. R1-1808750, Gothenburg, Sweden, Aug. 20-24, 2018, pp. 1-7.

* cited by examiner

DEVICE AND METHOD OF HANDLING AN UPLINK TRANSMISSION WITH SOUNDING REFERENCE SIGNALS

CROSS REFERENCE TO RELATED APPLICATIONS

This application claims the benefit of U.S. Provisional Application No. 62/991,598, filed on Mar. 19, 2020 and incorporated herein by reference.

BACKGROUND OF THE INVENTION

1. Field of the Invention

The present invention relates to a device and a method used in a wireless communication system, and more particularly, to a device and a method of handling an uplink transmission with sounding reference signals.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

In a low radio frequency (e.g., 5 GHz) unlicensed band, a UE may perform an omni transmission, after performing a successful listen-before-talk (LBT) procedure based on an omni-sensing (e.g., omni-sensing LBT procedure). Accordingly, a spatial relation (e.g., beam) for performing an UL transmission is determined according to a single sounding reference signal (SRS) configuration. However, in a high radio frequency (e.g., 60 GHz) unlicensed band, the UE may perform a directional transmission (e.g., beamforming transmission). In this case, multiple SRSs corresponding to multiple directions may be configured to the UE. Thus, how to perform the UL transmission with multiple SRSs is an important problem to be solved.

SUMMARY OF THE INVENTION

The present invention therefore provides a device and a method of handling an uplink (UL) transmission with sounding reference signals (SRSs) to solve the abovementioned problem.

A communication device for handling an UL transmission with a plurality of SRSs comprises at least one storage device; and at least one processing circuit, coupled to the at least one storage device. The at least one storage device stores instructions, and the at least one processing circuit is configured to execute the instructions of: selecting a SRS from a plurality of SRSs; performing a channel sensing procedure via a spatial relation associated with the SRS, to obtain a result; and performing an UL transmission via the spatial relation to a network according to the result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
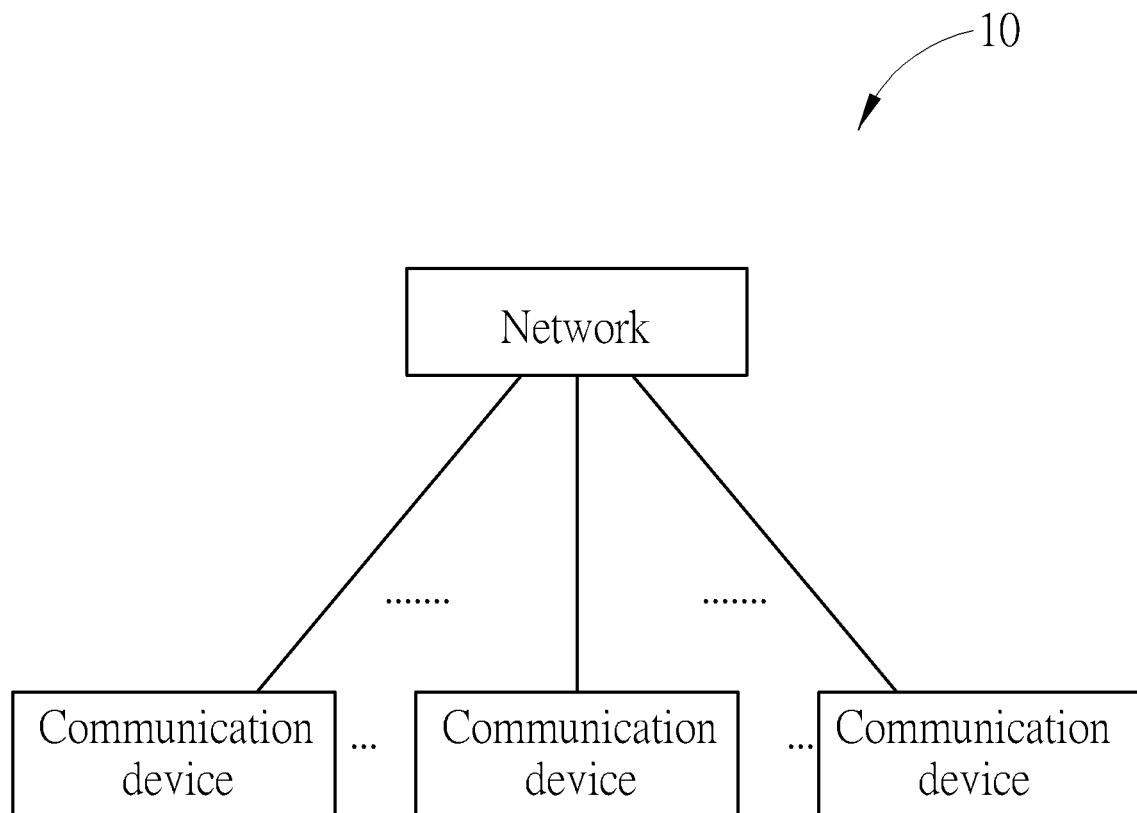
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one eNB, at least one next generation Node-B (gNB) and/or at least one fifth generation (5G) base station (BS). In one example, the network may be any BS conforming to a specific communication standard to communicate with a communication device.

A new radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT) device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
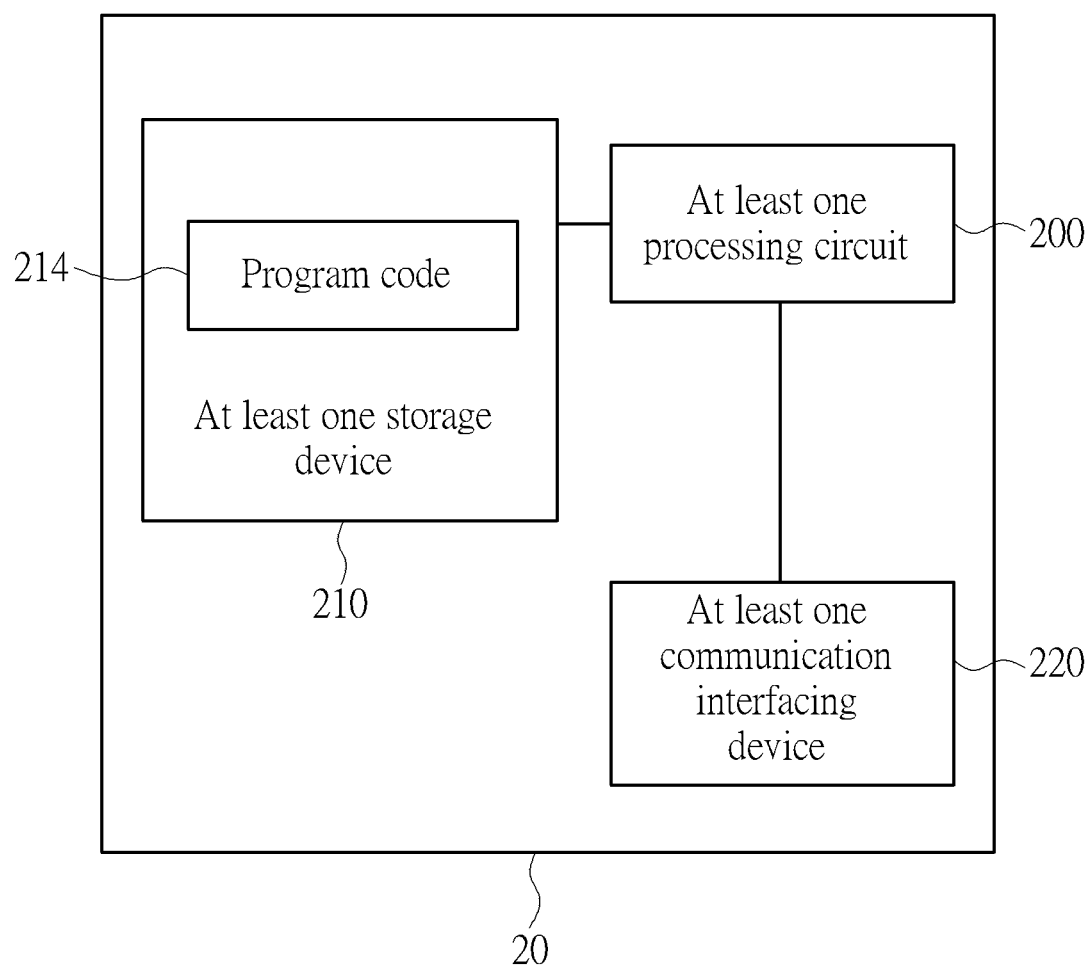
FIG. 2 is a schematic diagram of a communication device according to an example of the present invention.

FIG. 2 is a schematic diagram of a communication device 20 according to an example of the present invention. The communication device 20 may be used for realizing a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In a scenario that a UE performs a directional transmission in an unlicensed band, a directional-sensing listen-before-talk (LBT) procedure is more efficiency than an omni-sensing LBT procedure. In addition, directional-sensing LBT procedures in different directions are independent with each other (e.g., the UE may perform a failed directional-sensing LBT procedure in a first direction, but perform a successful directional-sensing LBT procedure in a second direction). In this case, multiple sounding reference signals (SRSs) corresponding to multiple directions may be configured to the UE.

Figure 3:
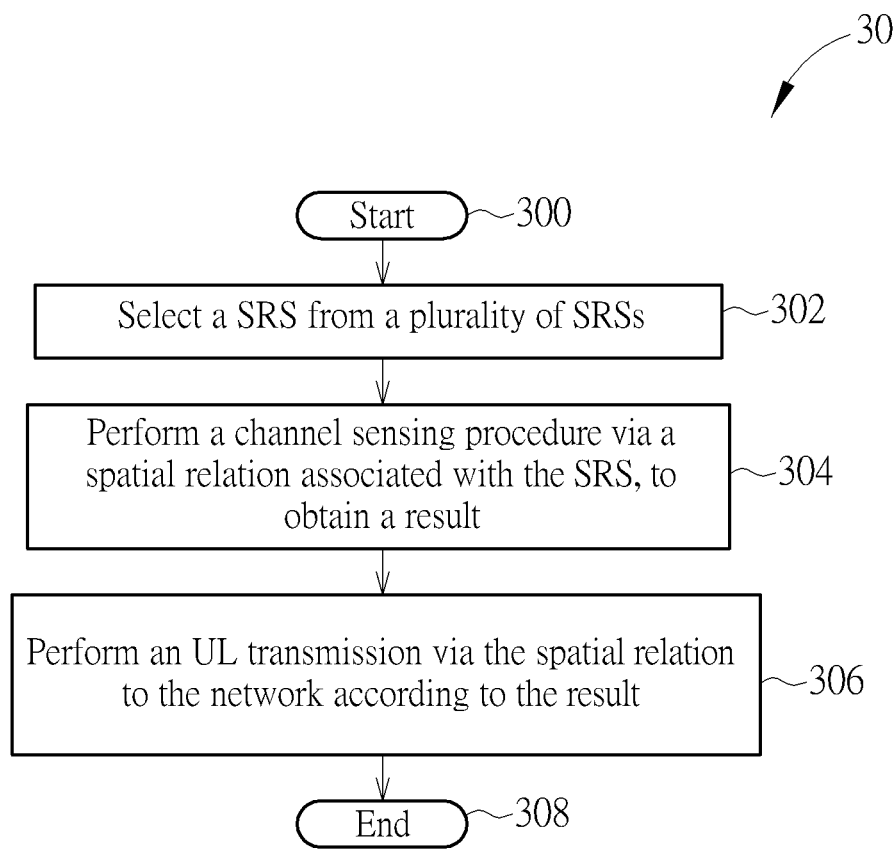
FIG. 3 is a flowchart of a process according to an example of the present invention.

FIG. 3 is a flowchart of a process 30 according to an example of the present invention. The process 30 may be utilized in a communication device, to handle an UL transmission with a plurality of SRSs. The process 30 may be compiled into the program codes 214 and includes the following steps:

Step 300: Start.
Step 302: Select a SRS from a plurality of SRSs.
Step 304: Perform a channel sensing procedure via a spatial relation associated with the SRS, to obtain a result.
Step 306: Perform an UL transmission via the spatial relation to the network according to the result.
Step 308: End.

According to the process 30, the communication device selects a SRS (e.g., SRS resource) from a plurality of (candidate) SRSs. The communication device performs a channel sensing procedure (e.g., directional-sensing) via a spatial relation (e.g., narrow-beam) associated with the SRS, to obtain a (sensing) result. Then, the communication device performs an UL transmission via the spatial relation to the network according to the result. That is, the SRS for performing the UL transmission is selected from the plurality of SRSs. Thus, the problem regarding the UL transmission configured with the plurality of SRSs is solved.

Realization of the process 30 is not limited to the above description. The following examples may be applied for realizing the process 30.

In one example, the communication device performs the UL transmission in a shared spectrum (e.g., unlicensed band or unlicensed serving cell). In one example, the UL transmission comprises (e.g., is) a configured grant (CG) transmission. In one example, the communication device performs the UL transmission in an UL transmission occasion (e.g., CG transmission occasion). In one example, the communication device performs the UL transmission via the spatial relation associated with the SRS to the network, if (e.g., when, after) the result indicates that the channel sensing procedure is successful (i.e., a channel associated with the spatial relation is clear). In one example, the communication device does not perform the UL transmission to the network, if the result indicates that the channel sensing procedure is failed (i.e., the channel is not clear). Note that the communication device may (re) select a SRS for performing the UL transmission from the plurality of SRSs, if the sensing result indicates that the channel sensing procedure is failed. In one example, the channel sensing procedure comprises (e.g. is) a LBT procedure (e.g., clear channel assessment (CCA) procedure) or a short LBT procedure. For example, the LBT procedure is a Category 4 of the LBT (Cat. 4 LBT).

In one example, the plurality of the SRSs are corresponding to a plurality of RSs, respectively. In one example, a plurality of quasi-colocation (QCL) assumptions of the plurality of the SRSs are a plurality of RSs, respectively. That is, the plurality of SRSs are QCLed with the plurality of RSs, and the plurality of SRSs and the plurality of RSs are transmitted according to channel characteristics. In one example, the plurality of QCL assumptions are determined (e.g., assumed) by the communication device.

In one example, the plurality of RSs are a plurality of channel state information-reference signals (CSI-RSs), a plurality of synchronization signal blocks (SSBs) or any type of RSs. In one example, the plurality of SRSs are associated with a plurality of spatial relations, and the plurality of spatial relations are associated with a plurality of RSs, respectively. For example, there are a plurality of spatial relation links (e.g., beam pair links) between the plurality of spatial relations and the plurality of RSs.

In one example, the plurality of SRSs are associated with a plurality of contention window (CW) sizes, respectively. In one example, the communication device selects the SRS from the plurality of SRSs according to the plurality of CW sizes. In one example, the SRS is associated with a smallest CW size of the plurality of CW sizes. That is, the SRS associated with the smallest CW size is selected for performing the UL transmission. In other words, the spatial relation associated with the smallest CW size is selected for performing the UL transmission. In one example, the channel sensing procedure is a LBT procedure (e.g., Cat. 4 LBT).

In one example, the UL transmission is not (performed) in a channel occupancy time (COT) of (e.g., acquired by) the network (e.g., gNB's COT). In one example, the UL transmission is in a COT of the network, and a DL signal received in the COT is QCLed with a RS different from the plurality of SRSs. For example, the RS and the plurality of SRSs are associated with different spatial relations. That is, a QCL assumption of the COT of the network is the RS. In one example, the COT of the network is acquired according to a LBT procedure associated with the RS by the network. For example, the network acquires the COT, if the network performs a successful Cat. 4 LBT via a spatial relation (e.g., beam) associated with the RS. Then, the COT is shared with the communication device.

In one example, the communication device selects the SRS from the plurality of SRSs according to the plurality of CW sizes, if the communication device monitors a physical DL control channel (PDCCH) according to (e.g., by using) a first plurality of search space sets with a first group index (e.g., search space sets with group index 0), wherein the first plurality of search space sets are used for monitoring the PDCCH outside of a COT of the network. That is, the first plurality of search space sets implicitly indicate that the UL transmission is not in the COT of the network.

In one example, the instruction of selecting the SRS from the plurality of SRSs according to the plurality of CW sizes includes selecting the SRS from the plurality of SRSs according to a plurality of SRS indices corresponding to the plurality of SRSs, if at least two of the plurality of SRSs are associated with a smallest CW size. That is, the communication device selects the at least two of the plurality of SRSs according to the plurality of CW sizes, and then selects the SRS from the at least two of the plurality of SRSs according to the plurality of SRS indices. In short, a two-step method is used for selecting the SRS. In one example, the SRS is corresponding to a smallest SRS index. That is, the SRS corresponding to the smallest SRS index is selected for performing the UL transmission.

In one example, the instruction of selecting the SRS from the plurality of SRSs according to the plurality of CW sizes includes selecting the SRS from the plurality of SRSs according to a plurality of mcsAndTBS indices corresponding to the plurality of SRSs, if at least two of the plurality of SRSs are associated with a smallest CW size. That is, a two-step method is used for selecting the SRS. In one example, the SRS is corresponding to a smallest mcsAndTBS index. That is, the SRS corresponding to the smallest mcsAndTBS index is selected for performing the UL transmission.

In one example, the plurality of SRSs are associated with a plurality of (backoff) counters. In one example, the communication device selects the SRS from the plurality of SRSs according to the plurality of counters. In one example, the SRS is associated with a smallest counter of the plurality of counters. A counter associated with a SRS is a random number between a zero and a CW size associated with the SRS. In one example, the channel sensing procedure is a LBT procedure (e.g., Cat. 4 LBT).

In one example, the communication device receives a DL signal QCLed with a RS from the network, and selects the SRS corresponding to the RS. In one example, the SRS and the RS are associated with the same spatial relation. In one example, the RS is one of the plurality of SRSs. In one example, the channel sensing procedure is a short LBT procedure associated with the RS. In one example, the UL transmission is in a COT of the network. In one example, the DL signal is received in a COT of the network. That is, a QCL assumption of the COT of the network is the RS. In one example, the COT of the network is acquired according to a LBT procedure associated with the RS by the network. For example, the network acquires the COT, if the network performs a successful Cat. 4 LBT via a spatial relation (e.g., beam) associated with the RS. Then, the COT is shared with the communication device.

In one example, the communication device selects the SRS corresponding to the RS, if the communication device detects a DL control information (DCI) in a control resource set (CORESET) according to (e.g., by using) a second plurality of search space sets with a second group index (e.g., search space sets with a group index 1), and the UL transmission is in a remaining length of a timer (e.g., in terms of symbols, slots or subframes) of the second plurality of search space sets, wherein the second plurality of search space sets are used for monitoring a PDCCH in a COT of the network. That is, the second search space sets implicitly indicate that the UL transmission is in the COT of the network. In one example, the DCI indicates that the UL transmission is in the remaining length of the timer. In one example, a QCL assumption of the CORESET is the RS.

In one example, the plurality of SRSs are corresponding to (e.g., one-to-one mapped to) a plurality of sequences, respectively. In one example, the UL transmission comprises at least one demodulation reference signal (DMRS), and the at least one DMRS is scrambled (e.g., by the communication device) with a sequence (e.g., DMRS sequence) determined according to the SRS. In one example, the at least one DMRS are comprised in a CG-physical UL shared channel (CG-PUSCH). In one example, the plurality of SRSs are configured by the network, and are corresponding to a plurality of SRS indices (SRIs) (e.g., SRS resource indicators), respectively. In one example, the UL transmission comprises a CG-UL control information (CG-UCI) indicating a SRI corresponding to the SRS to the network. That is, the communication device notifies the network that the SRS is (selected) for performing the UL transmission. In one example, the SRS is indicated in an UL-beam-field of the CG-UCI. In one example, the communication device transmits the CG-UCI in the CG-PUSCH, after transmitting a first DMRS in the CG-PUSCH. For example, the first DMRS is transmitted in a first symbol of the CG-PUSCH, and the CG-UCI is transmitted in a second symbol of the CG-PUSCH.

In one example, the communication device acquires a COT of the communication device, if the channel sensing procedure is a LBT procedure (e.g., Cat. 4 LBT), and the result indicates that the channel sensing procedure is successful. That is, a QCL assumption of the COT of the communication device is a RS corresponding to the SRS. In one example, the communication device performs the UL transmission in an UL part of the COT of the communication device.

In one example, the communication device receives a DL feedback indicator (DFI) in response to the UL transmission in a first CORESET from the network, after performing the UL transmission. In one example, the DFI is received via the spatial relation. That is, the spatial relation for performing the UL transmission is used for receiving the DFI. In one example, the communication device receives the DFI in a DL part of a COT of the communication device. In one example, the DFI comprises a hybrid automatic repeat request (HARQ) feedback for the UL transmission. Note that the HARQ feedback may be an acknowledgement (ACK) or a negative acknowledgement (NACK). In one example, the first CORESET is not configured with any transmission configuration indication (TCI) state. That is, even though the communication device does not receive a PDCCH (or a beam) for receiving the DFI, the communication device understands that the spatial relation is used for receiving the DFI. In one example, the first CORESET is configured with a TCI state indicating a RS corresponding to a SRI, wherein the SRI is corresponding to the SRS. That is, a QCL assumption of the first CORESET is the RS. In one example, the communication device does not monitor a DFI in a second CORESET, if the second CORESET is configured with a TCI state indicating a RS, and the RS is not corresponding to the SRS.

In one example, the plurality of SRSs are indicated by a plurality of SRS resource indicators received from the network.

In one example, the communication device receives the plurality of SRSs via an indication (e.g., an information element (IE) ConfiguredGrantConfig) transmitted by the network. In one example, the indication is comprised in a higher layer signaling (e.g., a radio resource control (RRC) message). In one example, the indication comprises at least one of a plurality of antenna ports, a plurality of DMRS sequence initializations, a plurality of precoding information and number of layers and a plurality of modulation and coding schemes (MCSs). In one example, there is a one-to-one correspondence (e.g., same index mapping) between the plurality of SRSs and the at least one of the plurality of antenna ports, the plurality of DMRS sequence initializations, the plurality of precoding information and number of layers and the plurality of MCSs.

In one example, the communication device receives the plurality of SRSs via a DCI (e.g., a SRS resource indicator field) transmitted by the network. In one example, a srs-ResourceIndicator field of the DCI indicates the plurality of SRSs. In one example, an antenna port field of the DCI indicates a plurality of antenna ports. In one example, a DMRS field of the DCI indicates a plurality of DMRS sequence initializations. In one example, a precodingAndNumberOfLayer field of the DCI indicates a plurality of precoding information and number of layers. In one example, a mcsAndTBS field of the DCI indicates a plurality of MCSs.

Figure 4:
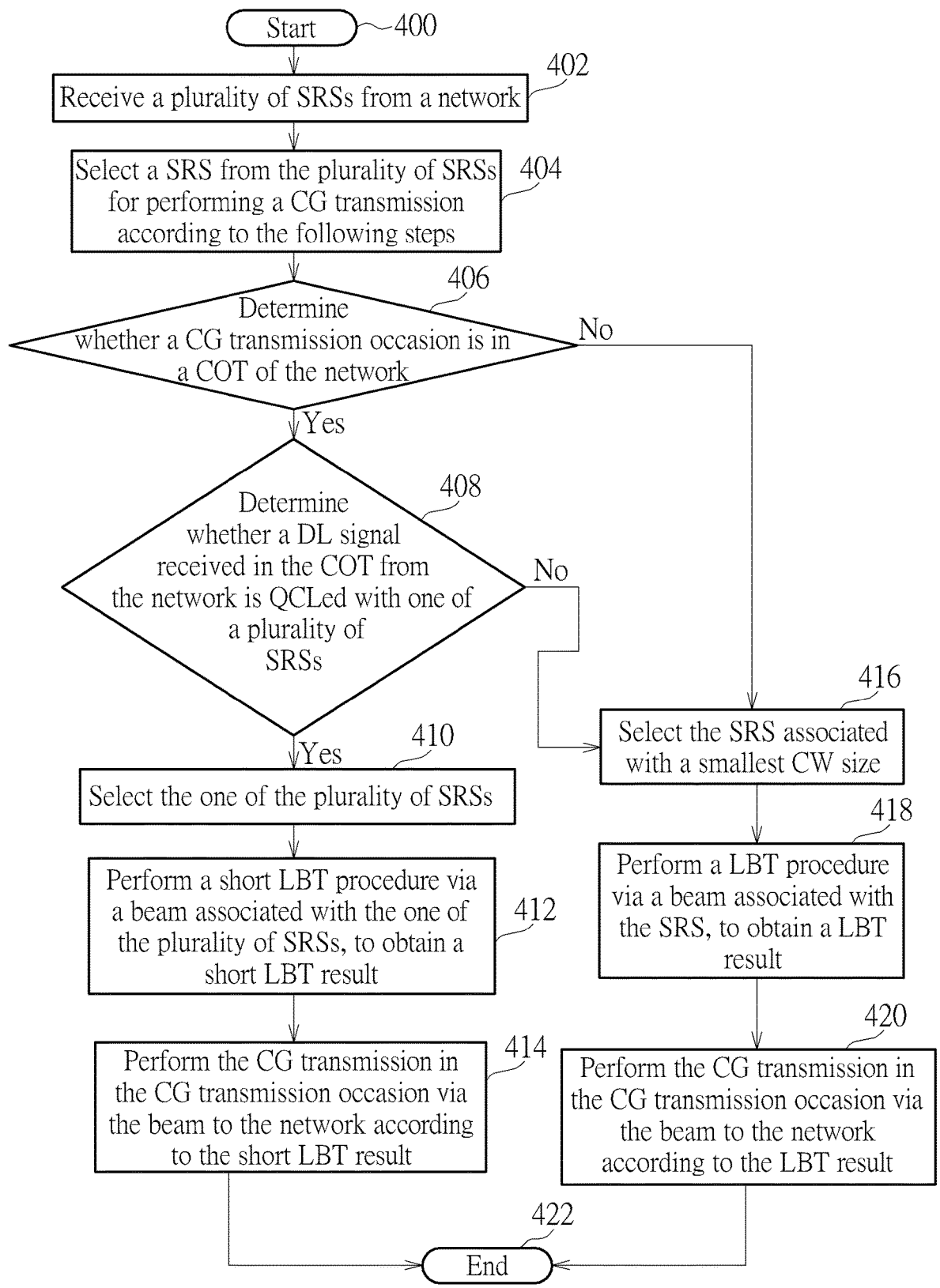
FIG. 4 is a flowchart of a process according to an example of the present invention.

Operations of the communication device in the above examples can be summarized into a process 40 shown in FIG. 4, and can be compiled into the program codes 214. The process 40 includes the following steps:

Step 400: Start.

Step 402: Receive a plurality of SRSs from a network.

Step 404: Select a SRS from the plurality of SRSs for performing a CG transmission according to the following steps.

Step 406: Determine whether a CG transmission occasion is in a COT of the network. If yes, perform Step 408, otherwise, perform Step 416.

Step 408: Determine whether a DL signal received in the COT from the network is QCLed with one of a plurality of SRSs. If yes, perform Step 410, otherwise, perform Step 416.

Step 410: Select the one of the plurality of SRSs.

Step 412: Perform a short LBT procedure via a beam associated with the one of the plurality of SRSs, to obtain a short LBT result.

Step 414: Perform the CG transmission in the CG transmission occasion via the beam to the network according to the short LBT result.

Step 416: Select the SRS associated with a smallest CW size.

Step 418: Perform a LBT procedure via a beam associated with the SRS, to obtain a LBT result.

Step 420: Perform the CG transmission in the CG transmission occasion via the beam to the network according to the LBT result.

Step 422: End.

Detailed operations and variations of the process 40 can be referred to the above illustration, and are not narrated herein.

Figure 5:
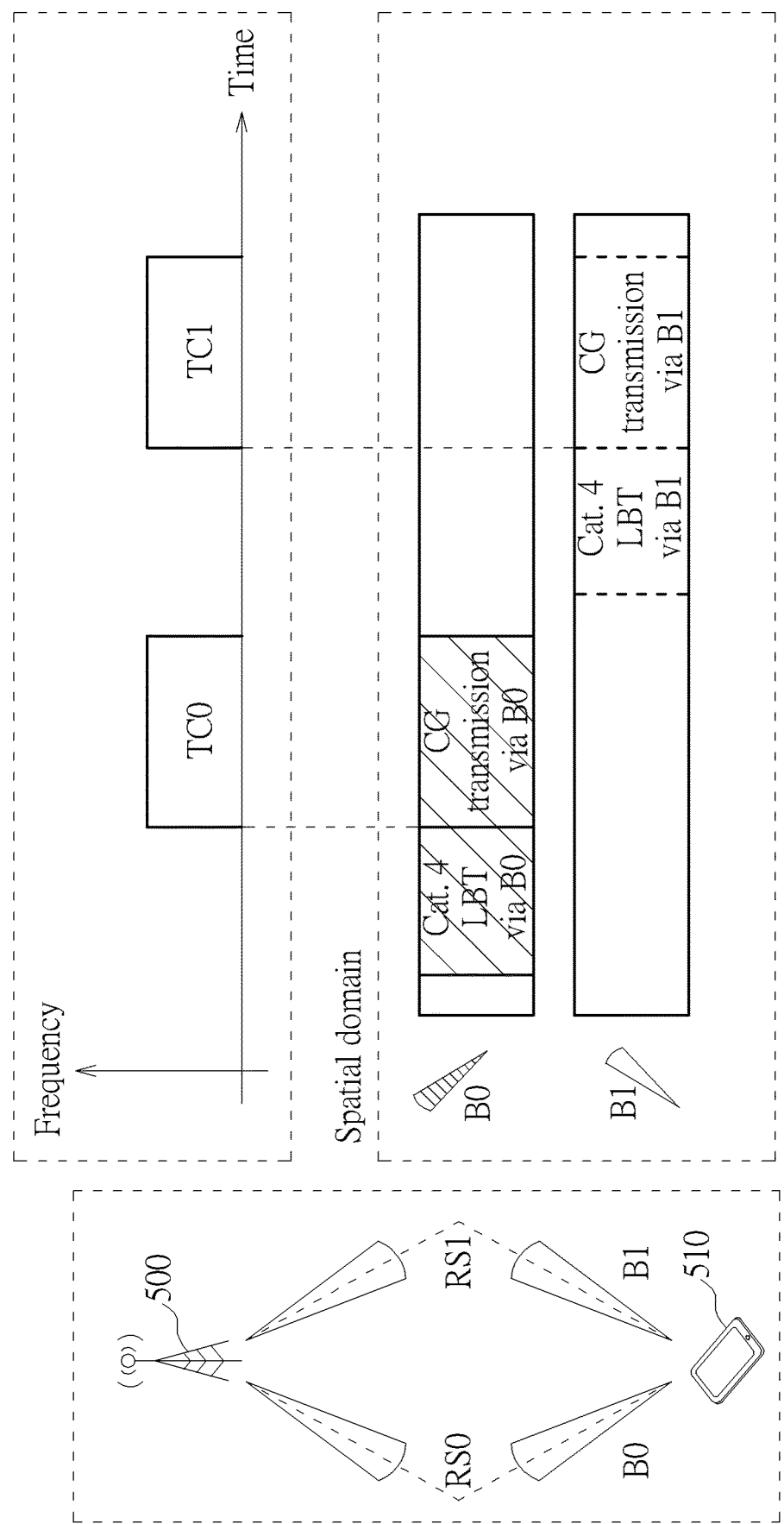
FIG. 5 is a schematic diagram of a CG transmission with SRSs according to an example of the present invention.

FIG. 5 is a schematic diagram of 50 according to an example of the present invention. As shown in FIG. 5, there are two CG transmission occasions TC0-TC1. In the present example, there are a first beam pair link between a RS RS0 and a beam B0 and a second beam pair link between a RS RS1 and a beam B1.

According to the present invention, a communication device 510 receives two SRSs SRS0-SRS1 from a network 500, wherein a QCL assumption of the SRS SRS0 is the RS RS0, and a QCL assumption of the SRS SRS1 is the RS RS1. Accordingly, the SRS SRS0 and the SRS SRS1 are associated with the beam B0 and the beam B1, respectively.

The communication device 510 has a CG data for a CG transmission. The communication device 510 selects a first SRS for performing the CG transmission in the CG transmission occasion TC0 from the SRSs SRS0-SRS1. The RS RS0 and the RS RS1 are associated with a CW size CW0 of the beam B0 and a CW size CW1 of the beam B1, respectively. Note that there are three cases of a size relation between the CW size CW0 and the CW size CW1.

In the first case, the CW size CW0 (e.g., 15) is smaller than the CW size CW1 (e.g., 63). As an example, the communication device 510 selects the first SRS from the SRSs SRS0-SRS1 according to the CW sizes with different sizes. In detail, the communication device 510 selects the SRS SRS0 (as the first SRS).

In the second case, the CW size CW0 and the CW size CW1 are the same. Note that a SRS index of the SRS SRS0 (i.e., 0) is smaller than a SRS index of the SRS SRS1 (i.e., 1). As an example, the communication device 510 may select the first SRS from the SRSs SRS0-SRS1 according to the SRS indices. In detail, the communication device 510 selects the SRS SRS0 (as the first SRS). That is, a two-step method is used for selecting the first SRS.

In the third case, the CW size CW0 (e.g., 63) is larger than the CW size CW1 (e.g., 15). Note that the RS RS0 and the RS RS1 are also associated with a counter N0 of the beam B0 and a counter N1 of the beam B1, respectively. In the present example, the counter N0 (e.g., 5) is smaller than the counter N1 (e.g., 14). That is, the RS RS0 is associated with a larger CW size and a smaller counter. As an example, the communication device 510 may select the first SRS from the SRSs SRS0-SRS1 according to the counters. In detail, the communication device 510 selects the SRS SRS0 (as the first SRS).

Then, the communication device 510 performs a Cat. 4 LBT procedure via the beam B0, to determine whether a channel associated with the beam B0 is clear. Note that "the CW size CW0 is smaller" implicitly indicates there is a higher probability that "the channel associated with the beam B0 is clear". If the communication device 510 determines that the channel is clear (i.e., the Cat. 4 LBT procedure is successful), the communication device 510 performs the CG transmission in the CG transmission occasion TC0 via the beam B0 to the network 500.

If the communication device 510 determines that the channel associated with the beam B0 is not clear (i.e., the Cat. 4 LBT procedure is failed), the communication device 510 fails to perform the CG transmission in the CG transmission occasion TC0. The communication device 510 starts to select a second SRS for performing the CG transmission in the CG transmission occasion TC1 from the SRSs SRS0-SRS1. For example, the communication device 510 selects the SRS SRS1 (as the second SRS).

Then, the communication device 510 performs a Cat. 4 LBT procedure via the beam B1, to determine whether a channel associated with the beam B1 is clear. If the communication device 510 determines that the channel is clear (i.e., the Cat. 4 LBT procedure is successful), the communication device 510 performs the CG transmission in the CG transmission occasion TC1 via the beam B1 to the network 500.

Note that the communication device 510 does not perform the operations of the Cat. 4 LBT procedure via the beam B1 and the CG transmission in the CG transmission occasion TC1 via the beam B1, if the communication device 510 performs the CG transmission in the CG transmission occasion TC0 via the beam B0 successfully. Thus, these two operations are represented by dash lines in FIG. 5.

Figure 6:
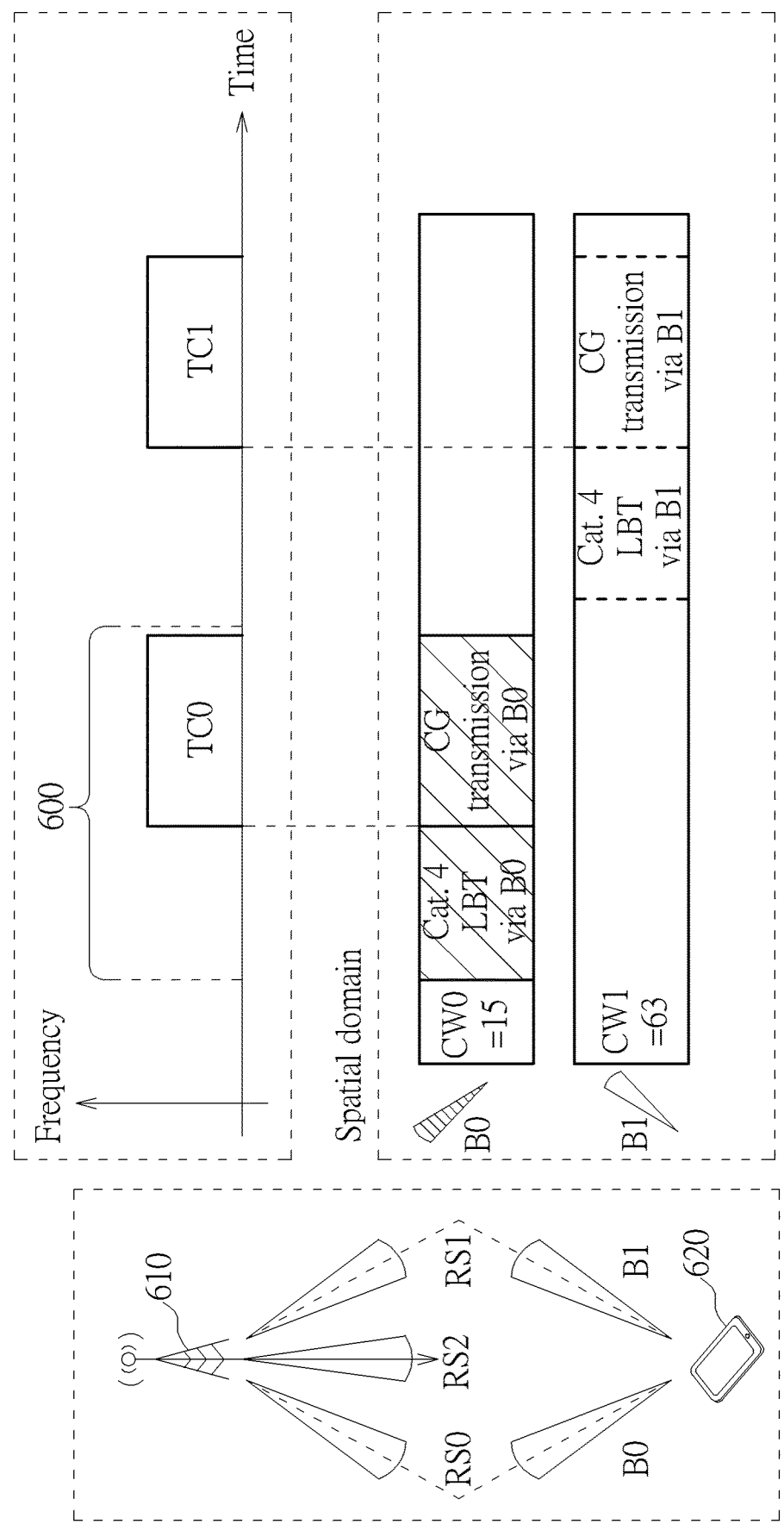
FIG. 6 is a schematic diagram of a CG transmission with SRSs according to an example of the present invention.

FIG. 6 is a schematic diagram of 60 according to an example of the present invention. As shown in FIG. 6, there are a COT 600 of a network 610 and two CG transmission occasions TC0-TC1. The COT 600 is shared with a communication device 620, and a QCL assumption of the COT 600 is a RS RS2. In the present example, there are a first beam pair link between a RS RS0 and a beam B0, a second beam pair link between a RS RS1 and a beam B1, and there is no beam pair link for the RS RS2.

According to the present invention, the communication device 620 receives two SRSs SRS0-SRS1 from the network 610, wherein a QCL assumption of the SRS SRS0 is the RS RS0, and a QCL assumption of the SRS SRS1 is the RS RS1. Accordingly, the SRS SRS0 and the SRS SRS1 are associated with the beam B0 and the beam B1, respectively.

The communication device 620 has a CG data for a CG transmission. The communication device 620 selects a first SRS for performing the CG transmission in the CG transmission occasion TC0 from the SRSs SRS0-SRS1. Note that the CG transmission occasion TC0 is in the COT 600. The RS RS0 and the RS RS1 are associated with a CW size CW0 of the beam B0 and a CW size CW1 of the beam B1, respectively. In the present example, the CW size CW0 is 15, and the CW size CW1 is 63.

Note that the QCL assumption of the COT 600 (i.e., the RS RS2) is different from the QCL assumptions of the SRSs SRS0-SRS1 (i.e., the RSs RS0-RS1), and the CW size CW0 is smaller than the CW size CW1. As an example, the communication device 620 selects the first SRS from the SRSs SRS0-SRS1 according to the CW sizes associated with the RSs RS0-RS1. In detail, the communication device 720 selects the SRS SRS0 (as the first SRS).

Then, the communication device 620 performs a Cat. 4 LBT procedure via the beam B0, to determine whether a channel associated with the beam B0 is clear. Note that "the CW size CW0 is smaller" implicitly indicates there is a higher probability that "the channel associated with the beam B0 is clear". If the communication device 620 determines that the channel is clear (i.e., the Cat. 4 LBT procedure is successful), the communication device 620 performs the CG transmission in the CG transmission occasion TC0 via the beam B0 to the network 610.

If the communication device 620 determines that the channel associated with the beam B0 is not clear (i.e., the Cat. 4 LBT procedure is failed), the communication device 620 fails to perform the CG transmission in the CG transmission occasion TC0. The communication device 620 starts to select a second SRS for performing the CG transmission in the CG transmission occasion TC1 from the SRSs SRS0-SRS1. For example, the communication device 620 selects the SRS SRS1 (as the second SRS).

Then, the communication device 620 performs a Cat. 4 LBT procedure via the beam B1, to determine whether a channel associated with the beam B1 is clear. If the communication device 620 determines that the channel is clear (i.e., the Cat. 4 LBT procedure is successful), the communication device 620 performs the CG transmission in the CG transmission occasion TC1 via the beam B1 to the network 610.

Note that the communication device 620 does not perform the operations of the Cat. 4 LBT procedure via the beam B1 and the CG transmission in the CG transmission occasion TC1 via the beam B1, if the communication device 620 performs the CG transmission in the CG transmission occasion TC0 via the beam B0 successfully. Thus, these two operations are represented by dash lines in FIG. 6.

Figure 7:
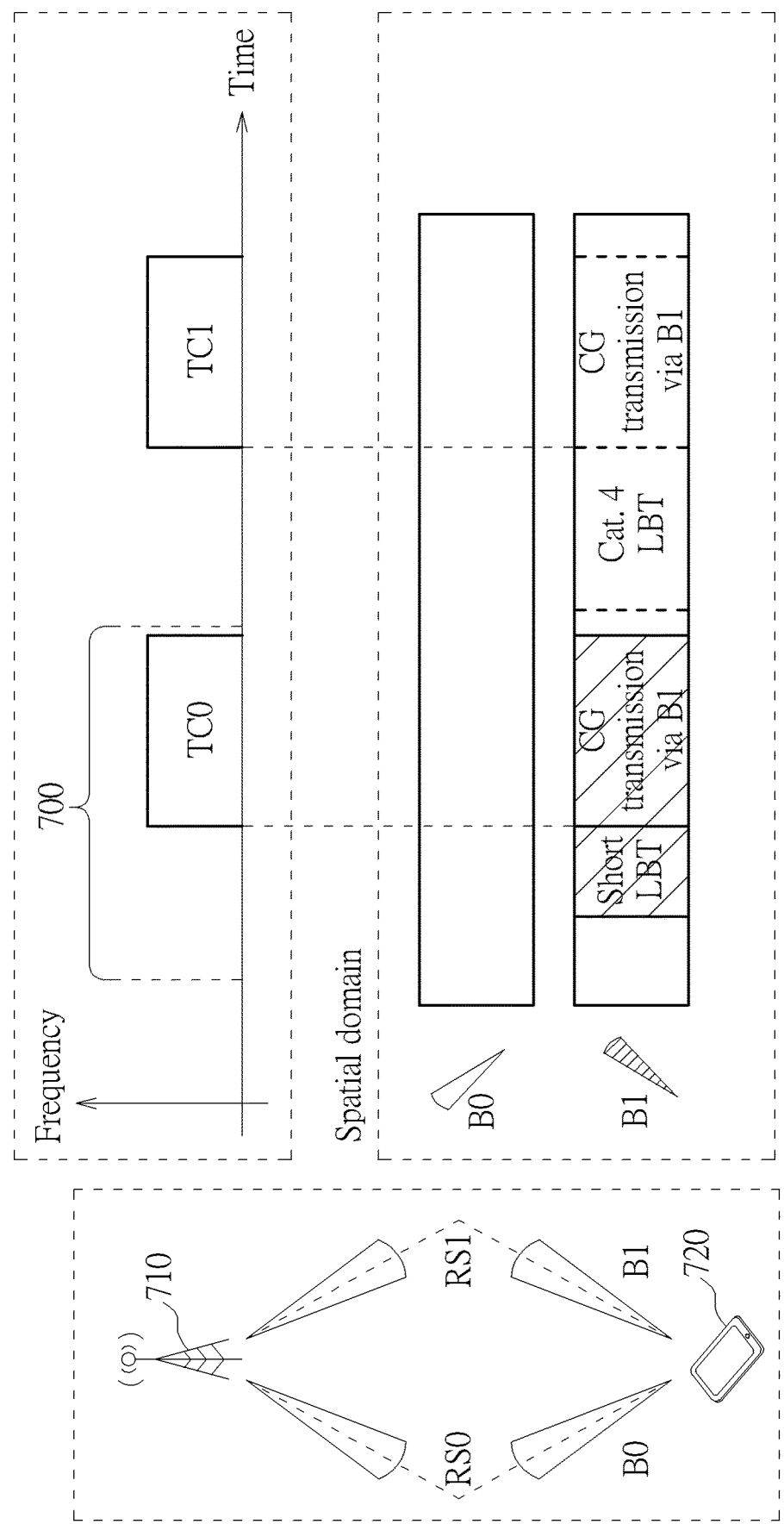
FIG. 7 is a schematic diagram of a CG transmission with SRSs according to an example of the present invention.

FIG. 7 is a schematic diagram of 70 according to an example of the present invention. As shown in FIG. 7, there are a COT 700 of a network 710 and two CG transmission occasions TC0-TC1. The COT 700 is shared with a communication device 720, and a QCL assumption of the COT 700 is a RS RS1. In the present example, there are a first beam pair link between a RS RS0 and a beam B0 and a second beam pair link between the RS RS1 and a beam B1.

According to the present invention, the communication device 720 receives two SRSs SRS0-SRS1 from the network 710, wherein a QCL assumption of the SRS SRS0 is the RS RS0, and a QCL assumption of the SRS SRS1 is the RS RS1. Accordingly, the SRS SRS0 and the SRS SRS1 are associated with the beam B0 and the beam B1, respectively.

The communication device 720 has a CG data for a CG transmission. The communication device 720 selects a first SRS for performing the CG transmission in the CG transmission occasion TC0 from the SRSs SRS0-SRS1 according to the RS RS0-RS1. Note that the CG transmission occasion TC0 is in the COT 700, and the QCL assumption of the COT 700 is the same as the QCL assumption of the SRS SRS1 (i.e., the RS RS1). As an example, the communication device 720 selects the SRS SRS1 (as the first SRS).

Then, the communication device 720 performs a short LBT procedure via the beam B1, to determine whether a channel associated with the beam B1 is clear. If the communication device 720 determines that the channel is clear (i.e., the short LBT procedure is successful), the communication device 720 performs the CG transmission in the CG transmission occasion TC0 via the beam B1 to the network 710.

If the communication device 720 determines that a channel associated with the beam B1 is not clear (i.e., the short LBT procedure is failed), the communication device 720 fails to perform the CG transmission in the CG transmission occasion TC0. The communication device 720 starts to select a second SRS for performing the CG transmission in the CG transmission occasion TC1 from the SRSs SRS0-SRS1. For example, the communication device 720 selects the SRS SRS1 (as the second SRS).

Then, the communication device 720 performs a Cat. 4 LBT procedure via the beam B1, to determine whether a channel associated with the beam B1 is clear. If the communication device 720 determines that the channel is clear (i.e., the Cat. 4 LBT procedure is successful), the communication device 720 performs the CG transmission in the CG transmission occasion TC1 via the beam B1 to the network 710.

Note that the communication device 720 does not perform the operations of the Cat. 4 LBT procedure and the CG transmission in the CG transmission occasion TC1 via the beam B1, if the communication device 720 performs the CG transmission in the CG transmission occasion TC0 via the beam B1 successfully. Thus, these two operations are represented by dash lines in FIG. 7.

Figure 8:
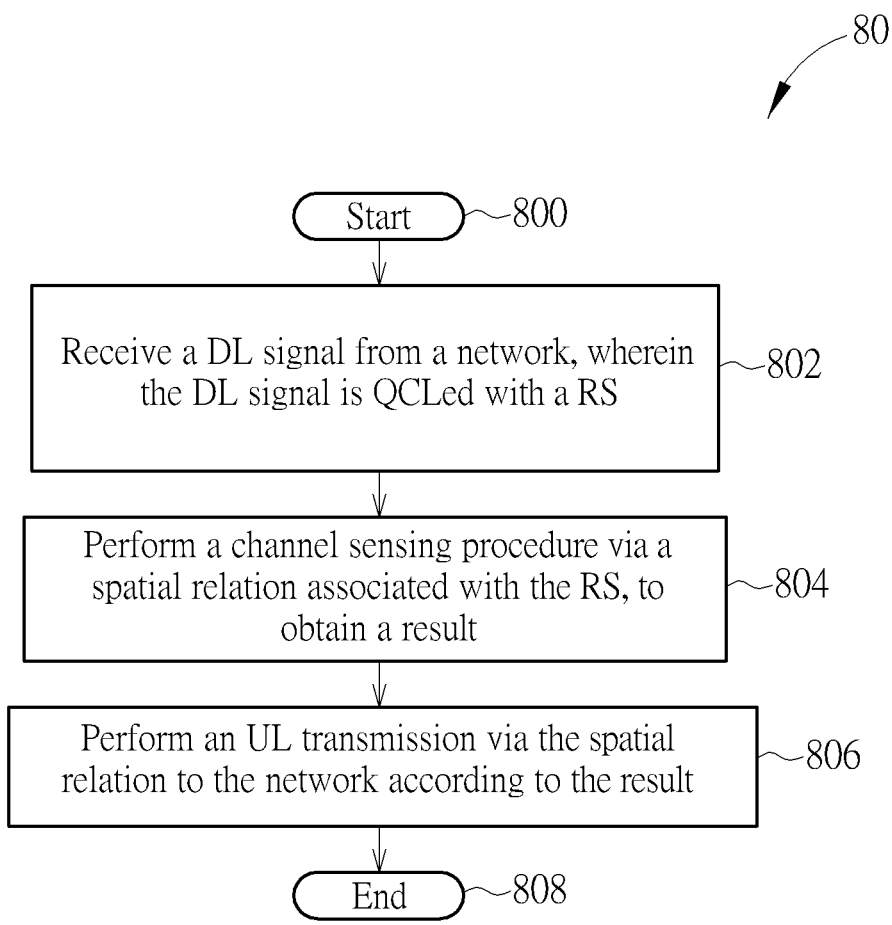
FIG. 8 is a flowchart of a process according to an example of the present invention.

FIG. 8 is a flowchart of a process 80 according to an example of the present invention. The process 80 may be utilized in a communication device, to handle an UL transmission without a SRS. The process 80 may be compiled into the program codes 214 and includes the following steps:

Step 800: Start.
Step 802: Receive a DL signal from a network, wherein the DL signal is QCLed with a RS.
Step 804: Perform a channel sensing procedure via a spatial relation associated with the RS, to obtain a result.
Step 806: Perform an UL transmission via the spatial relation to the network according to the result.
Step 808: End.

According to the process 80, the communication device receives a DL signal from a network, wherein the DL signal is QCLed with a RS. The communication device performs a channel sensing procedure (e.g., directional-sensing) via a spatial relation (e.g., narrow-beam) associated with the RS, to obtain a (sensing) result. Then, the communication device performs an UL transmission via the spatial relation to the network according to the result. That is, the RS QCLed with the DL signal is for performing the UL transmission. Thus, the problem regarding the UL transmission configured without any SRS is solved.

Realization of the process 80 is not limited to the above description. The following examples may be applied for realizing the process 80.

In one example, the communication device performs the UL transmission in a shared spectrum (e.g., unlicensed band or unlicensed serving cell). In one example, the UL transmission comprises (e.g., is) a configured grant (CG) transmission. In one example, the communication device performs the UL transmission in an UL transmission occasion (e.g., CG transmission occasion). In one example, the UL transmission is in a COT of the network. In one example, the DL signal is received in a COT of the network. That is, a QCL assumption of the COT of the network is the RS. In one example, the COT of the network is acquired according to a LBT procedure associated with the RS by the network. For example, the network acquires the COT, if the network performs a successful Cat. 4 LBT via a spatial relation associated with the RS. Then, the COT is shared with the communication device.

In one example, the communication device performs the UL transmission via the spatial relation associated with the RS to the network, if (e.g., when, after) the result indicates that that the channel sensing procedure is successful (i.e., a channel associated with the spatial relation is clear). In one example, the communication device does not perform the UL transmission to the network, if the result indicates that the channel sensing procedure is failed (i.e., the channel is not clear). In one example, the channel sensing procedure is a short LBT procedure associated with the RS.

In one example, the RS is a CSI-RS, a SSB or any type of RS. In one example, the RS is corresponding to the spatial relation. For example, there is a spatial relation link between the spatial relation and the RS.

In one example, the UL transmission comprises at least one DMRS in a CG-PUSCH. In one example, the UL transmission comprises a CG-UCI in a CG-PUSCH. In one example, the communication device transmits the CG-UCI in the CG-PUSCH, after transmitting a first DMRS in the CG-PUSCH. For example, the first DMRS is transmitted in a first symbol of the CG-PUSCH, and the CG-UCI is transmitted in a second symbol of the CG-PUSCH.

Figure 9:
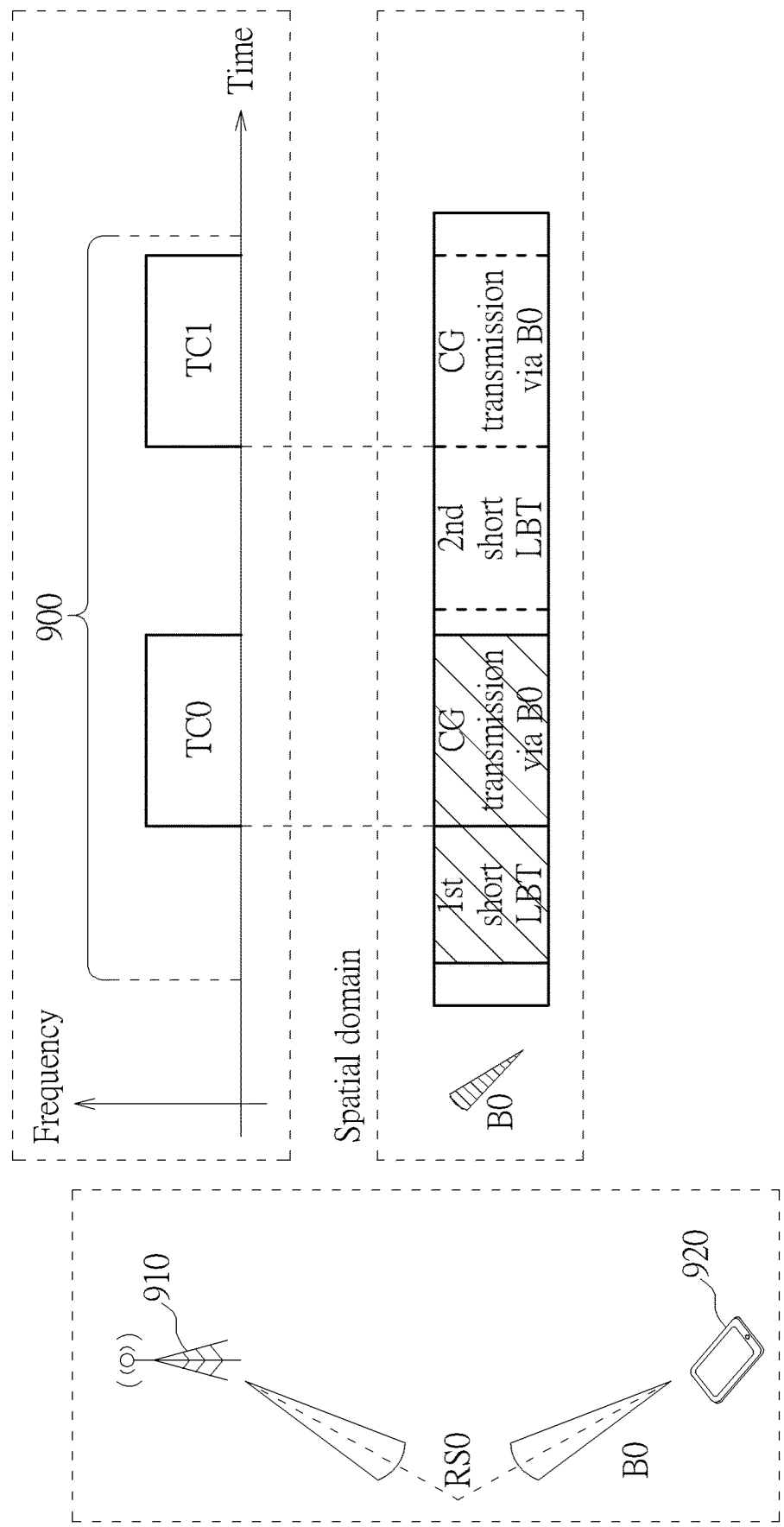
FIG. 9 is a schematic diagram of a CG transmission without a SRS according to an example of the present invention.

FIG. 9 is a schematic diagram of 90 according to an example of the present invention. As shown in FIG. 9, there are a COT 900 of a network 910 and two CG transmission occasions TC0-TC1 in the COT 900. The COT 900 is shared with a communication device 920, and a QCL assumption of the COT 900 is a RS RS0. In the present example, there is a beam pair link between the RS RS0 and a beam B0.

According to the present invention, the communication device 920 receives a DL signal (not shown in FIG. 9) in the COT 900 from the network 910, wherein the DL signal is QCLed with the RS RS0. The communication device 920 has a CG data for a CG transmission, wherein the CG transmission is not configured with any SRS. Note that the CG transmission occasion TC0 is in the COT 900, and the QCL assumption of the COT 900 is the RS RS0. As an example, the communication device 920 performs a first short LBT procedure via the beam B0, to determine whether a channel associated with the beam B0 is clear. If the communication device 920 determines that the channel is clear (i.e., the first short LBT procedure is successful), the communication device 920 performs the CG transmission in the CG transmission occasion TC0 via the beam B0 to the network 910.

If the communication device 920 determines that the channel associated with the beam B0 is not clear (i.e., the first short LBT procedure is failed), the communication device 920 fails to perform the CG transmission in the CG transmission occasion TC0. Note that the CG transmission occasion TC1 is in the COT 900, and the QCL assumption of the COT 900 is the RS RS0. As an example, the communication device 920 performs a second short LBT procedure via the beam B0, to determine whether a channel associated with the beam B0 is clear. If the communication device 920 determines that the channel is clear (i.e., the second short LBT procedure is successful), the communication device 920 performs the CG transmission in the CG transmission occasion TC1 via the beam B0 to the network 910.

Note that the communication device 920 does not perform the operations of the second short LBT procedure and the CG transmission in the CG transmission occasion TC1 via the beam B0, if the communication device 920 performs the CG transmission in the CG transmission occasion TC0 via the beam B0 successfully. Thus, these two operations are represented by dash lines in FIG. 9.

Figure 10:
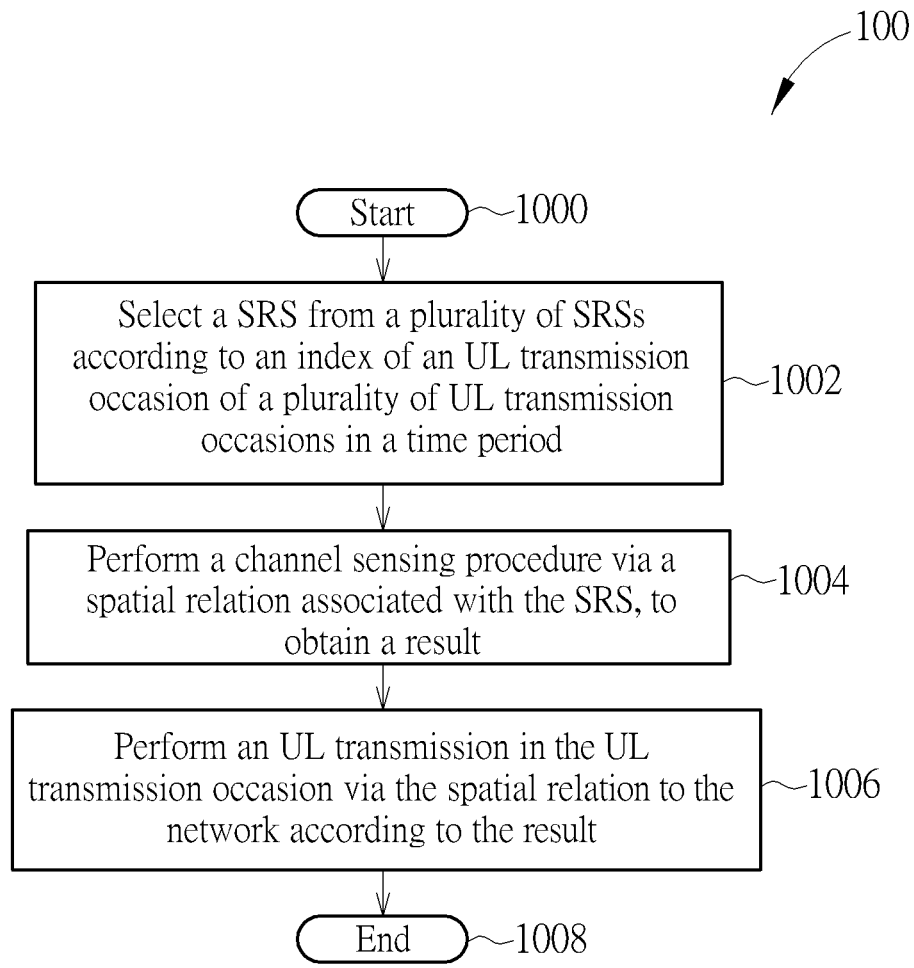
FIG. 10 is a flowchart of a process according to an example of the present invention.

FIG. 10 is a flowchart of a process 100 according to an example of the present invention. The process 100 may be utilized in a communication device, to handle an UL transmission with a plurality of SRSs. The process 100 may be compiled into the program codes 214 and includes the following steps:

Step 1000: Start.

Step 1002: Select a SRS from a plurality of SRSs according to an index of an UL transmission occasion of a plurality of UL transmission occasions in a time period.

Step 1004: Perform a channel sensing procedure via a spatial relation associated with the SRS, to obtain a result.

Step 1006: Perform an UL transmission in the UL transmission occasion via the spatial relation to the network according to the result.

Step 1008: End.

According to the process 100, the communication device receives a plurality of (candidate) SRSs from a network. The communication device selects a SRS from the plurality of SRSs according to an index of an UL transmission (candidate) occasion of a plurality of UL transmission (candidate) occasions in a time period. The communication device performs a channel sensing procedure (e.g., directional-sensing) via a spatial relation (e.g., narrow-narrow) associated with the SRS, to obtain a (sensing) result. Then, the communication device performs an UL transmission in the UL transmission occasion via the spatial relation to the network according to the result. That is, the SRS for performing the UL transmission in the UL transmission occasion is selected according to the index of the UL transmission occasion. Thus, the problem regarding the UL transmission configured with the plurality of SRSs is solved.

Realization of the process 100 is not limited to the above description. The following examples may be applied for realizing the process 100.

In one example, the communication device performs the UL transmission in a shared spectrum (e.g., unlicensed band or unlicensed serving cell). In one example, the UL transmission comprises (e.g., is) a configured grant (CG) transmission. In one example, the UL transmission occasion comprises (e.g., is) a CG transmission occasion. In one example, the communication device performs the UL transmission in the UL transmission occasion via the spatial relation associated with the SRS to the network, if (e.g., when, after) the result indicates that the channel sensing procedure is successful (i.e., a channel associated with the spatial relation is clear). In one example, the communication device does not perform the UL transmission in the UL transmission occasion via the spatial relation associated with the SRS to the network, if the result indicates that the channel sensing procedure is failed (i.e., the channel is not clear).

In one example, the channel sensing procedure is a LBT procedure (e.g., Cat. 4 LBT). In one example, a length of the time period is equal to a length of a periodicity of the UL transmission.

In one example, the communication device selects the SRS from the plurality of SRSs according to the index of the UL transmission occasion, a plurality of SRS indices corresponding to the plurality of SRSs and a number of the plurality of SRSs. In one example, a SRS index corresponding to the SRS is the same as a remainder obtained by dividing the index of the UL transmission occasion by the number of the plurality of SRSs.

In one example, the plurality of SRSs are corresponding to a plurality of RSs, respectively. In one example, a plurality of QCL assumptions of the plurality of the SRSs are a plurality of RSs, respectively. That is, the plurality of SRSs are QCLed with the plurality of RSs, and the plurality of SRSs and the plurality of RSs are transmitted according to channel characteristics. In one example, the plurality of QCL assumptions are determined (e.g., assumed) by the communication device.

In one example, the plurality of RSs area plurality of CSI-RSs, a plurality of SSBs or any type of RSs. In one example, the plurality of SRSs are associated with a plurality of spatial relations, and the plurality of spatial relations are associated with a plurality of RSs, respectively. For example, there are a plurality of spatial relation links between the plurality of spatial relations and the plurality of RSs.

In one example, the plurality of SRSs are corresponding to (e.g., one-to-one mapped to) a plurality of sequences, respectively. In one example, the UL transmission comprises at least one DMRS, and the at least one DMRS is scrambled (e.g., by the communication device) with a sequence (e.g., DMRS sequence) determined according to the SRS. In one example, the at least one DMRS are comprised in a CG-PUSCH. In one example, the plurality of SRSs are configured by the network, and are corresponding to a plurality of SRS indices (SRIs) (e.g., SRS resource indicators), respectively. In one example, the UL transmission comprises a CG-UCI indicating a SRI corresponding to the SRS to the network. That is, the communication device notifies the network that the SRS is (selected) for performing the UL transmission. In one example, the SRS is indicated in an UL-beam-field of the CG-UCI. In one example, the communication device transmits the CG-UCI in the CG-PUSCH, after transmitting a DMRS in the CG-PUSCH. For example, the DMRS is transmitted in a first symbol of the CG-PUSCH, and the CG-UCI is transmitted in a second symbol of the CG-PUSCH.

In one example, the plurality of SRSs are indicated by a plurality of SRS resource indicators received from the network.

In one example, the communication device receives the plurality of SRSs via an indication (e.g., an IE ConfiguredGrantConfig) transmitted by the network. In one example, the indication is comprised in a higher layer signaling (e.g., a RRC message). In one example, the indication comprises at least one of a plurality of antenna ports, a plurality of DMRS sequence initializations, a plurality of precoding information and number of layers and a plurality of MCSs. In one example, there is a one-to-one correspondence (e.g., same index mapping) between the plurality of SRSs and the at least one of the plurality of antenna ports, the plurality of DMRS sequence initializations, the plurality of precoding information and number of layers and the plurality of MCSs. In one example, the indication comprises a number of the plurality of the UL transmission occasions. For example, the number of the plurality of the UL transmission occasions is 2, 4 or 8.

In one example, the communication device receives the plurality of SRSs via a DCI (e.g., a SRS resource indicator field) transmitted by the network. In one example, a srs-ResourceIndicator field of the DCI indicates the plurality of SRSs. In one example, an antenna port field of the DCI indicates a plurality of antenna ports. In one example, a DMRS field of the DCI indicates a plurality of DMRS sequence initializations. In one example, a precodingAndNumberOfLayer field of the DCI indicates a plurality of precoding information and number of layers. In one example, a mcsAndTBS field of the DCI indicates a plurality of MCSs.

Figure 11:
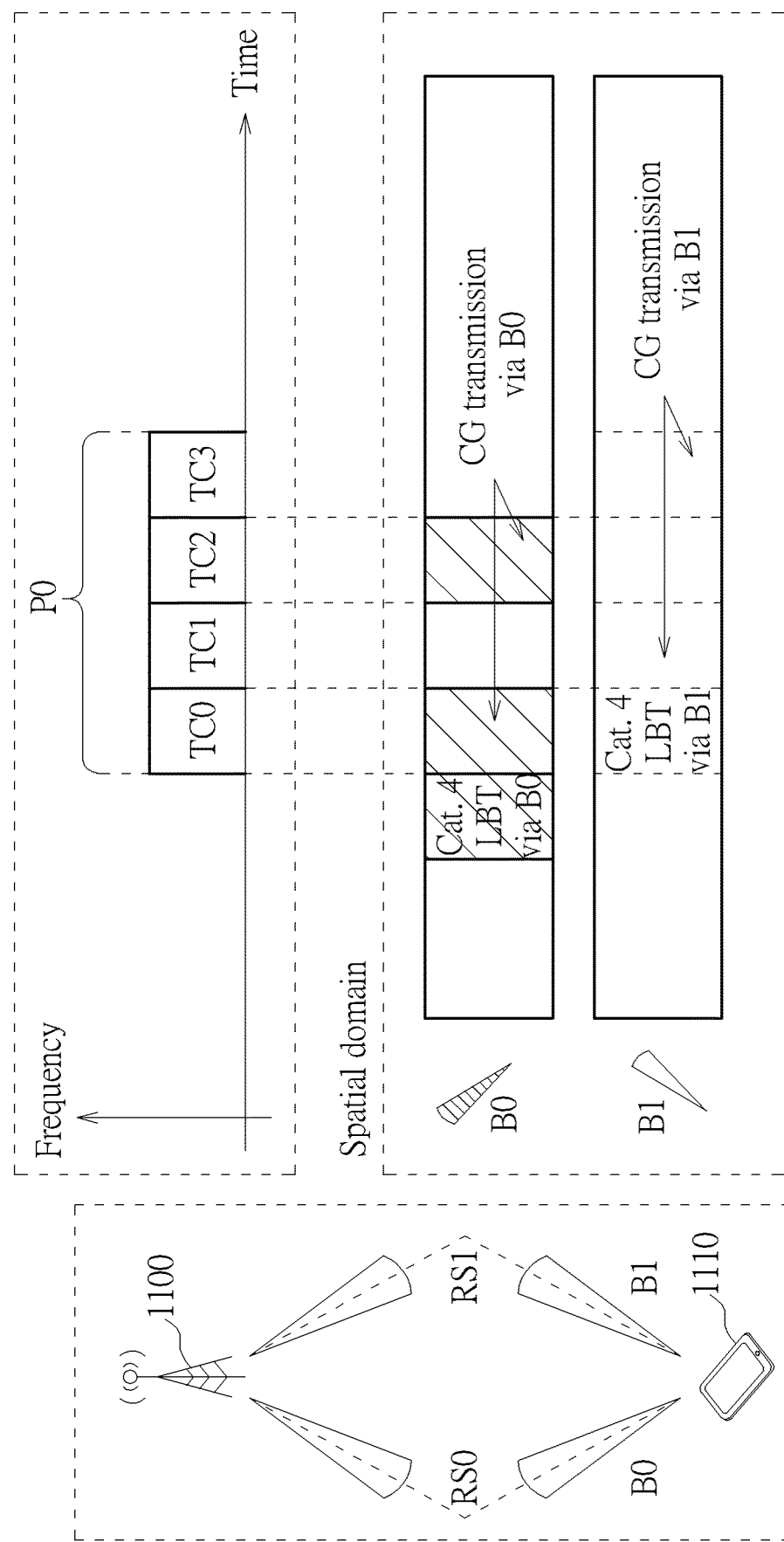
FIG. 11 is a schematic diagram of repetitions of a CG transmission with SRSs according to an example of the present invention.

FIG. 11 is a schematic diagram of 110 according to an example of the present invention. As shown in FIG. 11, there are a time period P0 and four CG transmission candidate occasions TC0-TC3 within the time period P0. In the present example, there are a first beam pair link between a RS RS0 and a beam B0 and a second beam pair link between a RS RS1 and a beam B1.

According to the present invention, a communication device 1110 receives two SRSs SRS0-SRS1 from a network 1100, wherein a QCL assumption of the SRS SRS0 is the RS RS0, and a QCL assumption of the SRS SRS1 is the RS RS1. Accordingly, the SRS SRS0 and the SRS SRS1 are associated with the beam B0 and the beam B1, respectively.

The communication device 1110 has a CG data for a CG transmission. The communication device 1110 selects a SRS for performing the CG transmission in the CG transmission candidate occasion TC0 from the SRSs SRS0-SRS1 according to an index of the CG transmission candidate occasion TC0. The communication device 1110 obtains that a first remainder is 0, by dividing the index of the CG transmission candidate occasion TC0 (i.e., 0) by a number of the two SRSs SRS0-SRS1 (i.e., 2). Note that a SRS index of the SRS SRS0 is the same as the first remainder. As an example, the communication device 1110 selects the SRS SRS0 as the SRS. Then, the communication device 1110 performs a Cat. 4 LBT procedure via the beam B0, to determine whether a channel associated with the beam B0 is clear.

If the communication device 1110 determines that the channel is clear (i.e., the Cat. 4 LBT procedure via the beam B0 is successful), the communication device 1110 performs the CG transmission in the CG transmission candidate occasion TC0 via the beam B0 to the network 1100. Note that a third remainder obtained by dividing an index of the CG transmission candidate occasion TC2 (i.e., 2) by the number of the two SRSs SRS0-SRS1 (i.e., 2) is the same as the SRS index of the SRS SRS0 (i.e., 0). Thus, the communication device 1110 may select the SRS SRS0 for performing the CG transmission in the CG transmission candidate occasion TC2. The communication device 1110 may perform the CG transmission in the CG transmission candidate occasion TC2 via the beam B0 to the network 1100, if the communication device 1110 determines that the channel is clear.

Note that a second remainder obtained by dividing an index of the CG transmission candidate occasion TC1 (i.e., 1) by the number of the two SRSs SRS0-SRS1 (i.e., 2) is the same as a SRS index of the SRS SRS1 (i.e., 1), and a fourth remainder obtained by dividing an index of the CG transmission candidate occasion TC3 (i.e., 3) by the number of the two SRSs SRS0-SRS1 (i.e., 2) is the same as the SRS index of the SRS SRS1 (i.e., 1). Thus, the communication device 1110 may select the SRS SRS1 for performing the CG transmission in the CG transmission candidate occasions TC1 and TC3, and perform a Cat. 4 LBT procedure via the beam B1, to determine whether a channel associated with the beam B1 is clear.

If the communication device 1110 determines that the channel is clear (i.e., the Cat. 4 LBT procedure via the beam B1 is successful), the communication device 1110 performs the CG transmission in the CG transmission candidate occasions TC1 and TC3 via the beam B1 to the network 1100.

Note that the communication device 1110 does not perform the Cat. 4 LBT procedure via the beam B0 and the Cat. 4 LBT procedure via the beam B1 simultaneously. Thus, the operations of the Cat. 4 LBT procedure via the beam B1 and the CG transmission in the CG transmission occasions TC1 and TC3 via the beam B1 are represented by dash lines in FIG. 11.

In the above examples, a spatial relation may be for UL, and a QCL assumption may be for DL, but are not limited herein. In one example, the spatial relation and the QCL assumption may be used interchangeably.

In the above examples, a beam may be replaced by an antenna, an antenna port, an antenna element, a group of antennas, a group of antenna ports, a group of antenna elements, a spatial domain filter, a reference signal resource, but is not limited herein. For example, a first beam may be represented by a first antenna port, a first group of antenna ports or a first spatial domain filter.

In the above examples, the network may be replaced by a cell, a serving cell, a transmission reception point (TRP), an unlicensed cell, an unlicensed serving cell, an unlicensed TRP, a gNB, an eNB, but is not limited herein.

The operation of "determine" described above may be replaced by the operation of "compute", "calculate", "obtain", "generate", "output, "use", "choose/select" or "decide". The term of "according to" described above may be replaced by "in response to". The phrase of "associated with" described above may be replaced by "of" or "corresponding to". The term of "indicated in" described above may be replaced by "indicated by". The term of "via" described above may be replaced by "on", "in" or "at". The term of "in" described above may be replaced by "within". The term "at least one of . . . or . . . " described above may be replaced by "at least one of . . . or at least one of . . . " or "at least one selected from the group of . . . and . . . ".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage device) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and method for handling an UL transmission with a plurality of SRSs. Operations to be performed by the communication device and the network are defined. Thus, the SRS for performing the UL transmission is selected from the plurality of SRSs. As a result, the problem of handling the UL transmission configured with the plurality of SRSs is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling an uplink (UL) transmission with a plurality of sounding reference signals (SRSs), comprising:
at least one storage device; and
at least one processing circuit, coupled to the at least one storage device, wherein the at least one storage device stores instructions, and the at least one processing circuit is configured to execute the instructions of:
receiving a downlink (DL) signal quasi-colocated (QCLed) via a first spatial relation from a plurality of spatial relations, wherein the first spatial relation is associated with a RS from a network;
selecting a SRS corresponding to the RS from the plurality of SRSs;
performing a channel sensing procedure via a second spatial relation associated with the SRS, to obtain a result; and
performing the UL transmission via the second spatial relation to the network according to the result;
wherein the plurality of SRSs are configured by the network, and are corresponding to a plurality of SRS indices (SRIs), respectively;
wherein the first spatial relation and the second spatial relation are the same.

2. The communication device of claim 1, wherein the communication device performs the UL transmission in a shared spectrum.

3. The communication device of claim 1, wherein the UL transmission comprises a configured grant (CG) transmission.

4. The communication device of claim 1, wherein the communication device performs the UL transmission via the second spatial relation associated with the SRS to the network, if the result indicates that the channel sensing procedure is successful.

5. The communication device of claim 1, wherein the plurality of SRSs are associated with the plurality of spatial relations, and the plurality of spatial relations are associated with a plurality of RSs, respectively.

6. The communication device of claim 1, wherein the plurality of SRSs are associated with a plurality of contention window (CW) sizes, respectively.

7. The communication device of claim 6, wherein the communication device selects the SRS from the plurality of SRSs according to the plurality of CW sizes.

8. The communication device of claim 7, wherein the SRS is associated with a smallest CW size of the plurality of CW sizes.

9. The communication device of claim 1, wherein the channel sensing procedure is a listen-before-talk (LBT) procedure.

10. The communication device of claim 1, wherein the UL transmission is not in a channel occupancy time (COT) of the network.

11. The communication device of claim 1, wherein the UL transmission is in a COT of the network, and a downlink (DL) signal received in the COT is quasi-colocated (QCLed) with a RS different from the plurality of SRSs.

12. The communication device of claim 11, wherein the COT is acquired according to a LBT procedure associated with the RS by the network.

13. The communication device of claim 1, wherein the SRS and the RS are associated with the same spatial relation.

14. The communication device of claim 1, wherein the channel sensing procedure is a short LBT procedure associated with the RS.

15. The communication device of claim 1, wherein the UL transmission is in a COT of the network.

16. The communication device of claim 1, wherein the DL signal is received in a COT of the network.

17. The communication device of claim 16, wherein the COT is acquired according to a LBT procedure associated with the RS by the network.

18. The communication device of claim 1, wherein the UL transmission comprises at least one demodulation reference signal (DMRS), and the at least one DMRS is scrambled with a sequence determined according to the SRS.

19. The communication device of claim 1, wherein the UL transmission comprises a CG-UL control information (CG-UCI) indicating a SRI corresponding to the SRS to the network.

20. The communication device of claim 1, wherein the instructions further comprise:
receiving a DL feedback indicator (DFI) in response to the UL transmission in a control resource set (CORESET) from the network, after performing the UL transmission.

21. The communication device of claim 20, wherein the CORESET is not configured with any transmission configuration indication (TCI) state.

22. The communication device of claim 20, wherein the CORESET is configured with a TCI state indicating a RS corresponding to a SRI, wherein the SRI is corresponding to the SRS.

* * * * *